(12) United States Patent
Vishal (10) Patent No.: US 11,720,547 B2
(45) Date of Patent: Aug. 8, 2023

(54) BLOCKCHAIN SERVICE BASED APPLICATION GENERATOR

(71) Applicant: SAP SE, Walldorf (DE)

(72) Inventor: Vivek Vishal, Bangalore (IN)

(73) Assignee: SAP SE, Walldorf (DE)

( * ) Notice: Subject to any disclaimer, the term of this patent is extended or adjusted under 35 U.S.C. 154(b) by 282 days.

(21) Appl. No.: 17/088,083

(22) Filed: Nov. 3, 2020

(65) Prior Publication Data
US 2022/0138180 A1    May 5, 2022

(51) Int. Cl.
*G06F 16/23*     (2019.01)
*G06F 9/451*     (2018.01)
*G06F 16/25*     (2019.01)

(52) U.S. Cl.
CPC .......... *G06F 16/2379* (2019.01); *G06F 9/451* (2018.02)

(58) Field of Classification Search
CPC ..... G06F 16/2379; G06F 9/451; G06F 16/252
See application file for complete search history.

(56) References Cited

U.S. PATENT DOCUMENTS

| | | |
|---|---|---|
| 2018/0308072 A1 | 10/2018 | Smith et al. |
| 2019/0066068 A1* | 2/2019 | Mitchell ............... G06Q 20/10 |
| 2019/0102409 A1* | 4/2019 | Shi ..................... H04L 41/5054 |
| 2019/0116036 A1 | 4/2019 | Sabharwal et al. |
| 2019/0238525 A1* | 8/2019 | Padmanabhan ....... H04L 9/3236 |
| 2020/0005292 A1* | 1/2020 | Mao ..................... H04L 9/3247 |
| 2020/0252205 A1* | 8/2020 | Padmanabhan ....... H04L 9/0643 |
| 2020/0313904 A1* | 10/2020 | Ramgopal ................ G06F 8/38 |
| 2022/0021751 A1* | 1/2022 | Devine ................. H04L 67/133 |

OTHER PUBLICATIONS

Bankole, K. & Nguyen, A., "Leverage blockchain monitoring," printed from https://developer.ibm.com/technologies/blockchain/patterns/leverage-blockchain-monitoring/, 6 pages, Jul. 18, 2018.
Chung, G et al., "Performance Tuning and Scaling Enterprise Blockchain Applications," Research Paper, arXiv:1912.11456v1 [cs.DC], 49 pages, Dec. 24, 2019.

(Continued)

*Primary Examiner* — Robert W Beausoliel, Jr.
*Assistant Examiner* — Mohammad S Bhuyan
(74) *Attorney, Agent, or Firm* — Sterne, Kessler, Goldstein & Fox P.L.L.C.

(57) ABSTRACT

Disclosed herein are various embodiments for blockchain service based application generator. An embodiment operates by determining a blockchain service configured to access, store, and receive updates to transactional data of the blockchain service. An enhanced data object including a wrapper with one or more additional properties corresponding to an original data object of the blockchain service is generated. The enhanced data object is transformed into a data protocol object. Metadata is generated based on the data protocol object. A data protocol service is generated based on the metadata. The application interface is configured based on the metadata, wherein the application interface is configured to communicate with both the data protocol service and the blockchain service. The application interface is provided to a user who is enabled to update the transactional data through the application interface.

20 Claims, 4 Drawing Sheets

(56) References Cited

OTHER PUBLICATIONS

Edge, M., "Build and deploy an application for Hyperledger Fabric on Amazon Managed Blockchain," printed from https://aws.amazon.com/biogs/database/build-and-deploy-an-application-for-hyperledger-fabric-on-amazon-managed-blockchain/, 11 pages, Jan. 14, 2019.
Handy, A., "Building a No-Code Blockchain App with IBM Blockchain Platform and Joget on OpenShift," printed from https://www.openshift.com/blog/building-a-no-code-blockchain-app-with-ibm-blockchain-platform-and-joget-on-openshift, 16 pages, Mar. 2, 2020.
"Interacting with Hyperledger Composer RESTful API," printed from https://developer.ibm.com/recipes/tutorials/interacting-with-hyperledger-composer-through-restful-api/, 8 pages, Jun. 17, 2019.
Li, D., "Build a Blockchain PoC Application Using Hyperledger Fabric," printed from https://dzone.com/articles/build-a-blockchain-poc-application-using-hyperledg, 12 pages, Jun. 5, 2019.

\* cited by examiner

BLOCKCHAIN SERVICE BASED APPLICATION GENERATOR

BACKGROUND

A blockchain represents a system to capture information using blockchain service, in blocks that are linked together. A block can be simply understood as digital information while the chain could represent a database. For a user to access or update the records of a blockchain, the user is going to require an application or visual interface that is configured to enable such record access. However, developing such an application interface is both a complicated, resource intensive, and time consuming task that often requires hiring expertise, such as developers with blockchain, middleware service, and front end or UI development experience. As a result, many organizations with business processes that fit or may benefit from the blockchain architecture that would otherwise like to implement a blockchain based solution may not pursue blockchain because of the significant overhead required to build such a solution.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

A blockchain represents a system to capture information using blockchain service, in blocks that are linked together. A block can be simply understood as digital information while the chain could represent a database. For a user to access or update the records of a blockchain, the user is going to require an application or visual interface that is configured to enable such record access. However, developing such an application interface is both a complicated, resource intensive, and time consuming task that often requires hiring expertise, such as developers with blockchain, middleware service, and front end or UI development experience. As a result, many organizations with business processes that fit or may benefit from the blockchain architecture that would otherwise like to implement a blockchain based solution may not pursue blockchain because of the significant overhead required to build such a solution.

Figure 1:
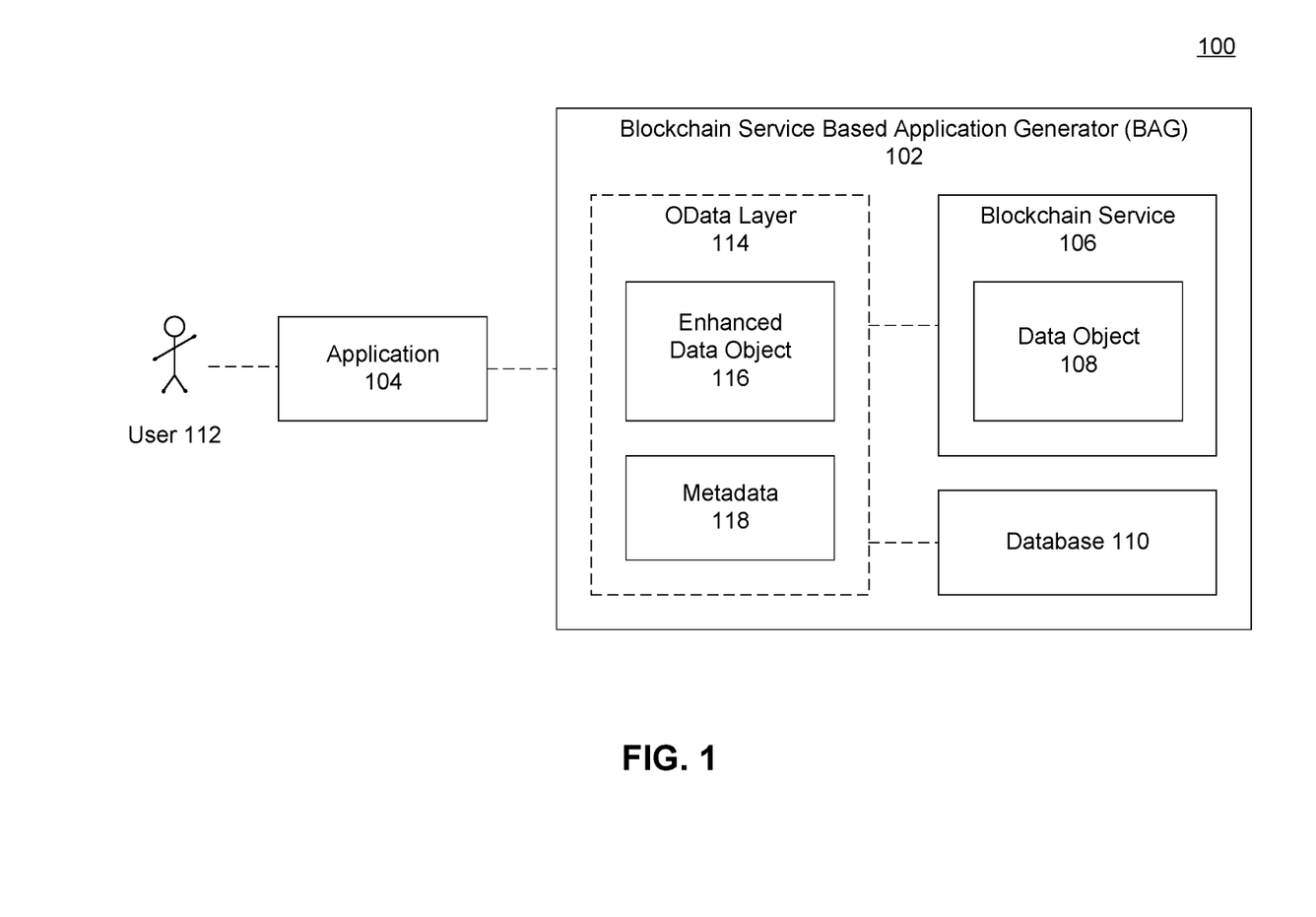
FIG. 1 is a block diagram illustrating example functionality related to operations of a blockchain service based application generator, according to some example embodiments.

FIG. 1 is a block diagram 100 illustrating example functionality related to operations of a blockchain service based application generator (BAG) 102, according to some example embodiments. Rather than requiring developers from different skillsets or organization to invest the substantial capital, time, and computing resources to develop a loosely coupled and independent layered solution which needs manual integration to implement a blockchain based solution, BAG 102 may enable the automated creation of blockchain compatible applications 104.

A developer may then customize the application 104 to fit the business process needs of the respective organization for which the solution is implemented. This may result in significantly less computing resources to create a robust and tightly coupled different layered blockchain based solution that is built on different layers which were automated or created using BAG 102 because applications often cannot be created directly with blockchain, but instead may need to integrate with another middleware or intermediary service (such as Odata or web services). BAG 102 may also enable automated integration between each of these individual layers or components. As a result, this may also help to significantly reduce the money investment and developer time that would otherwise be required to create blockchain application 104.

A blockchain service 106 (also referred to herein as blockchain 106) may include a list of records that are stored in blocks and linked together. Blockchain 106 may include a distributed ledger that can record transactions between two or more parties, which may be managed as a collective or as part of a peer-to-peer network. Once recorded, the data in any given block cannot be altered retroactively without alteration of all subsequent blocks which requires a consensus of the network majority (e.g., the majority of the parties who are members of the blockchain 106). This may add a level of security not present in a normal data storage system.

Blockchain service 106 may include a data object 108. Data object 108 may be a transaction or any kind of data that fulfils the purpose of a transaction, that is written to the ledger. In an embodiment, data object 108 may correspond to data that is also stored in or referenced by a database 110. Database 110 may be a row-oriented or column-oriented database that is used to store data for use by application 104. In an embodiment, application 104 may enable data create, read, update, and/or delete (CRUD) access to both blockchain 106 and/or database 110.

Data object 108 may include any data or transaction that is stored on a digital ledger of transactions on the blockchain 106. In an embodiment, data object 108 may include a data or business object or entity that is used to refer to one or more fields or records corresponding to the data object 108. For example, data object 108 may be used to store patient information, and the various fields may include first name, last name, physician name, medical condition, and prescriptions. In another embodiment, data object 108 may refer to each of the individual fields themselves. However, data object 108 is not limited to storing medical records, and can store any information including but not limited to manufacturing details, financial records, supply chain details, procurement process related details, customer information etc. or any other information that fits into the blockchain use cases.

In an embodiment, database 110 may store any information not managed by blockchain 106. In an embodiment, this may include information that a particular organization, which may be a member of blockchain 106, wants to keep private from other members of the blockchain 106. Example information, may include internal account or purchase history, payment history, or other financial or personnel information.

In an embodiment, database 110 may store information that supplements the information stored in the ledger of blockchain 106. For example, database 110 may include a customer name, account number, and address information, while blockchain 106 may store account balance and social security number information for that customer. In another embodiment, database 110 may include, in part, information that is managed by and retrieved from blockchain 106.

Application 104 may be a data access application that makes available for create, read, update, and/or delete access data from database 110 using the blockchain service 106. However, as referenced above, developing an application 104 that accesses blockchain service 106 is often a resource intensive and time consuming enough task that the overhead required may cause some individuals, companies, or organization to engage people from different specialized skillsets for longer implementation duration, put altogether. This can put in jeopardy the security of customer or other sensitive or financial information that may benefit from being managed by blockchain 106.

BAG 102 may automatically (without developer code input) create an application 104 that communicates with blockchain 106. Applicant 104 may allow an end user 112 to access and update the transactional data stored on blockchain 106 (and/or database 110). A developer may then customize the interface of application 104, if necessary, according to particular specifications or the requirements of a business process or a user 112.

Application 104 may include front-end or user interface components that cannot directly communicate with or read/access the data or data objects 108 of blockchain service 106. In an embodiment, a data object 108 may be of a particular format that enables blockchain compatibility, however accessing the data object 108 may require middleware or transformation services—which may be generated, at least in part, by BAG 102. These middleware components may be referred to herein as Odata (e.g., open data protocol). But in other embodiment, the middleware may include any other middleware services or protocol.

Odata, an open protocol enables the creation and consumption of RESTful APIs may provide methods for interactions between different applications, and define the source or medium of integration between these applications or components. Odata may enable the querying, finding, and updating of data through different data systems, including blockchain 106, database 110 and/or any other traditional databases. In an embodiment, application 104 may be a front end application that can use a web service as a middleware service to enable the integration with the blockchain service 106, database 110, or any other traditional database.

In an embodiment, BAG 102 may generate or customize an Odata layer 114 to communicate with the data object(s) 108 of Blockchain 106. In an embodiment, Odata layer 114 (which may also be referred to as Odata 114) may be an open protocol that allows the creation and consumption of queryable and interoperable REST (representational state transfer) APIs (application programming interfaces). Odata 114 may enable web clients to publish and edit resources using HTTP (hypertext transfer protocol) messages. While primarily referred to herein as Odata and Odata layer 114, in another embodiment, BAG 102 may be compatible with additional or different service layers. For example, BAG 102 may be generated with web services in addition to or in lieu of Odata.

In an embodiment, BAG 102 may generate an enhanced data object 116 to consume the data or transactional information from the data object 108. Enhanced data object 116 may include references to data object 108, but in a format that is configured for consumption by Odata 114. For example, BAG 102 may generate a wrapper with one or more additional properties and/or objects to reference data object 108. A wrapper may be function or subroutine whose main purpose or function it is to call a second function or subroutine. In an embodiment, the wrapper may include functions that enable creating, reading, updating, and/or deleting a data object 108 of blockchain 106. In an embodiment, blockchain 106 may include multiple data objects 108, each of which may include its own wrapper function and be stored as a corresponding enhanced data object 116.

In an embodiment, BAG 102 may also generate metadata 118. As noted above, blockchain 106 may include various types of information that is stored, or various different data objects 108. Metadata 118 may capture or represent any information about and/or relationships between the various data objects 108 of blockchain 106. For example, metadata 118 may indicate that a particular manufacturing record for a product includes data objects for product specification and/or product location. Or, for example, metadata 118 may indicate that there may be a relationship between a product and its linked sales order item or a hospital data object and a physician data object when the identified physician works in the identified hospital.

Using enhanced data object 116 and metadata 118, BAG 102 may enable Odata layer 114 to create and transform the metadata of the data object 108 from blockchain service to an OData protocol and also establish a communication standard between a front-end interface for application 104 that is accessible by one or more systems or human users 112, and blockchain 106. However, rather than requiring a developer to create all of the wrapper objects for enhanced data objects 116 and the metadata 118, and as will be discussed in greater detail below create or generate the application 104 itself, BAG 102 may include a predetermined set of functions for wrapper objects which are then applied to the various data objects 108. BAG 102 may also similarly establish communications between a backend database 110 and Odata layer 114. This may enable access to database 110 from application 104 as well.

Figure 2:
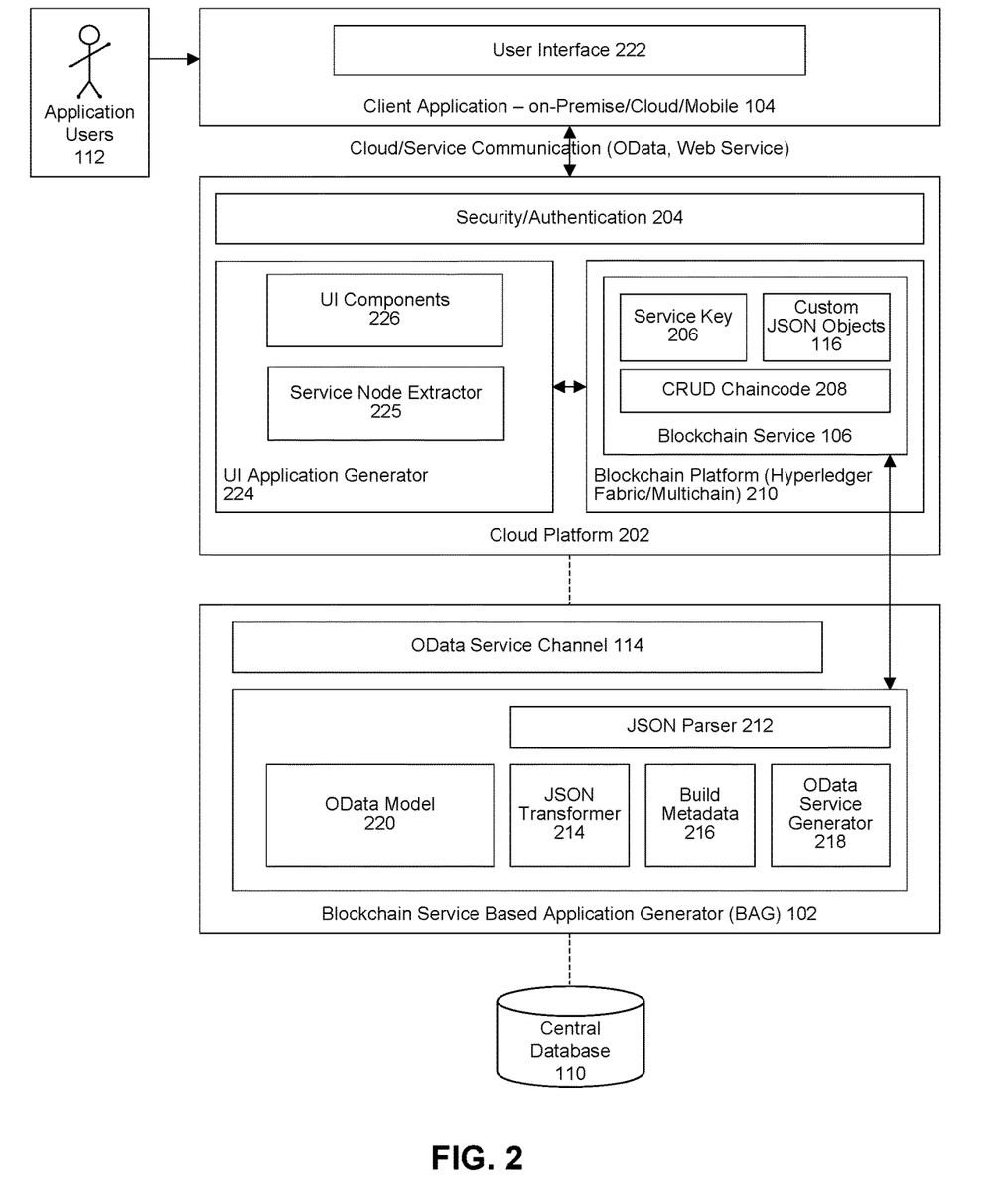
FIG. 2 is another block diagram illustrating example functionality related to operations of blockchain service based application generator, according to some example embodiments.

FIG. 2 is another block diagram 200 illustrating example functionality related to operations of blockchain service based application generator (BAG) 102, according to some example embodiments.

Rather than requiring a customer or organization to hire multiple different developers, such as blockchain developer, middleware developer, and user interface developer to try and write code to get the various system components to work together, BAG 102 may automatically generate an OData service channel and layer 114 and a UI application 104 that directly or indirectly communicates with a blockchain service 106 using the generated Odata service channel 114, referred to above as Odata 114.

In an embodiment, blockchain 106 may reside in a cloud platform 202. Cloud platform 202 may be any computing service that makes data or services available to many users over the Internet. In an embodiment, cloud platform 202 may include a security or authentication feature 204 that verifies any users 112 who wants to access and update transactional data using the blockchain service 106 on the blockchain. Security 204 may require a username, password, or single sign on or any other standard authentication from users 112. Security 204 may provide different users different permissions (e.g., read, write, update, delete) based on that particular user's permissions or security clearance or role.

In an embodiment, a blockchain service 106 may include a service key 206. Service key 206 may indicate parameters or specifications of blockchain service 106. In an embodiment, service key 206 may indicate what type of blockchain service is being used, or to what application a particular blockchain service 106 is being used. In an embodiment, service key 206 may provide information on the identification of communication channel, and the authentication parameters. In an embodiment, the blockchain platform 210 may make available blockchain 106 as a service. In such embodiments, blockchain 106, as to be accessed by users 112 through application 104, may be provided on a subscription basis and be assigned a service key 206 identifying and/or configuring the blockchain 106 according to the member's needs.

In an embodiment, BAG 102 may use service key 206 to create or configure a blockchain service 106. In another embodiment, BAG 102 may build application 104 using a pre-established blockchain service 106. In an embodiment, blockchain service 106 may be provided on a blockchain platform 210 which may be service provided by a vendor as part of a cloud platform 202.

In an embodiment, blockchain 106 may include CRUD chaincode 106. As noted above, CRUD may refer to code or functionality that enables for the creation, reading, updating, and deleting of data objects 108 and/or data that is stored within the data objects 108 of blockchain 106. Chaincode may be a lossless compression algorithm. In an embodiment, CRUD chaincode 106 may be used to create, read, update, and/or delete data stored in JSON (JavaScript Object Notation) on blockchain 106.

JSON is an example of an open standard file format that uses human-readable text to store and transmit objects that include attribute value pairs and array data types. Blockchain service 106 may create, read, update, and delete data using JSON. A JSON parser 212 may read the JSON of blockchain 106 and identify the various fields and relationships of data as it is stored in blockchain 106.

A JSON transformer 214 may translate the JSON into or generate custom JSON objects 116. In an embodiment, JSON transformer 214 may build or generate custom JSON objects 116 from data stored on or by blockchain service 106 (as read by JSON parser 212). In an embodiment, JSON transformer 214 may use CRUD chaincode 208 to identify data objects (e.g., data objects 108) from the JSON of blockchain 106. As noted above, JSON transformer 214 may then generate a custom JSON object 116, which may be an embodiment of the enhanced data object 116 as referred to above in FIG. 1. Custom JSON object 116 may include functionality that corresponds to the create, read, update and delete functionality provided through CRUD chaincode 208.

At 216, BAG 102 may build the metadata 118 referred to above in FIG. 1. As described above, the metadata 118 built at 216 may include the relationships between the various custom JSON objects 116 as identified by JSON parser 212 and provided by JSON transformer 214.

The result of build metadata 216 may be that BAG 102 has a summary of the various objects and relationships between the objects of blockchain service 106. An Odata service generator 218 may use the metadata 118 resulting from build metadata 216 and custom JSON objects 116, including their CRUD functionality corresponding to chaincode 208, to generate an Odata model 220. Odata model 220 may be bound to Odata service channel 114 and enable communicates between Odata service channel 114 and blockchain service 106 through custom JSON objects 116. Odata service channel 114 may then allow for communications between the front end of application 104 through one or more UI components 226 and the backend where data is being stored or managed (e.g., blockchain 106 and/or central database 110).

A UI application generator 224 may create or generate a front end or user interface 222 of application 104 using one or more UI components 226. As illustrated, LI application generator 224 may also generate connections between user interface 222 and cloud platform 202 and Odata service channel 114.

UI application generator 224 either may be located on or operate from the cloud platform 202, or may operate from a backend server or other non-cloud infrastructure. In an embodiment, UI application generator 224 may identify various OData service nodes, their attributes or fields (corresponding to the built metadata 216), their relationships or association to other nodes and generate visual representations of the various identified service nodes or custom JSON objects 116 to implement the functionality of the target business process.

A service node extractor 225 may communicate with blockchain service 106 and copy or extract service details from CRUD chaincode 208. These service details may be integrated with UI components 226, enabling users 112 to create, read, updated, and/or delete the transactional data a stored in the ledger of blockchain service 106.

The generated fields of user interface 222 may allow for data to be created, read, updated, and/or deleted through user interface 222. The user interface 222 may also include one or more visual components that allow for the creation or deletion of data which are connected to blockchain 106 through generic Odata services communication. In an embodiment, the visual components of user interface 222 may also include fields that correspond to creating, reading, updating, and/or deleting data from central database 110.

UI components 226 may include fields, boxes, charts, or other text or graphical user interface elements used to read or modify data from blockchain 106 and/or database 110. In an embodiment, UI components 226 may also include modifications provided by a developer. The developer may remove or enhance the automatically generated components 226 to suit the target business process. In an embodiment, a developer may also add their own new custom text, modifications, formatting, or components 226 for user interface 222. Users 112 may then read and update transactional data through user interface 222 of application 104 using their mobile devices or laptops.

Figure 3:
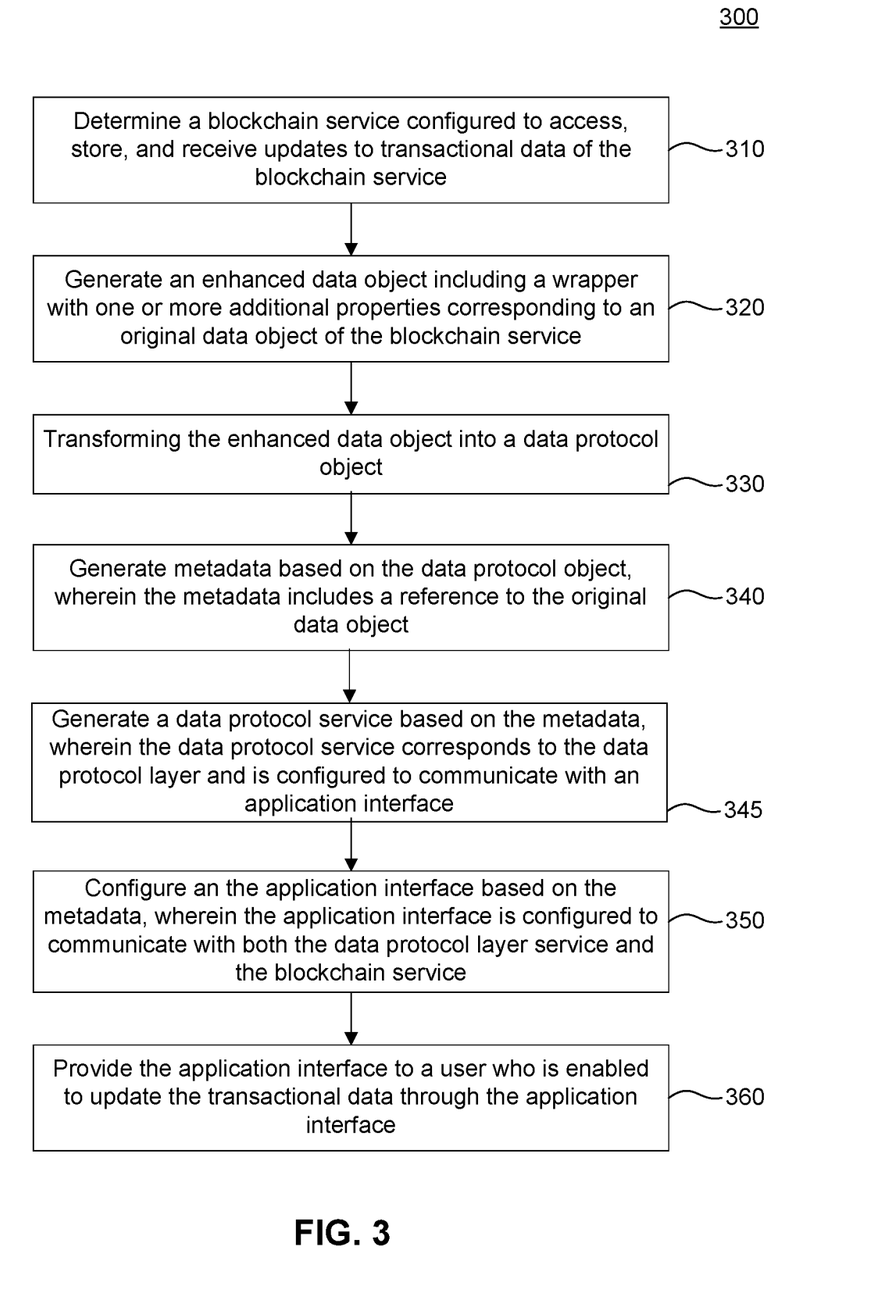
FIG. 3 is a flowchart illustrating example operations for providing a blockchain service based application generator, according to some embodiments.

FIG. 3 is a flowchart 300 illustrating example operations for providing a blockchain service based application generator, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to the figures.

In 310, a blockchain service configured to access, store, and receive updates to transactional data of the transactional data service is determined, wherein the blockchain service includes an original transactional data for a business object. For example, blockchain service 106, which may access, store and receive updates may include a data object 108. In an embodiment, data object 108 may be a business object that includes original transactional data. The data object 108 may correspond to data that is being stored by blockchain service 106 in JSON, on a digital ledger. An example data object 108 may include a record, such as a sales transaction, with various fields of entry, such as date, amount, customer, provider, account number, and description.

In 320, an enhanced data object including a wrapper with one or more additional properties corresponding to an original data object of the blockchain service is generated. For example, BAG 102 may generate an enhanced data object 116. As illustrated in FIG. 2, in an embodiment, JSON transformer 214 may generate a custom JSON object 116 which may include one or more wrapper functions or data values that correspond to an underlying data object of blockchain service 106.

In 330, the enhanced data object is transformed into a data protocol object. In an embodiment, the data protocol object may be configured to be readable by a data protocol layer configured to communicate with the blockchain service. For example, after JSON transformer 214 generates a custom JSON object 116, Odata service generator 218 may include references to the custom JSON object 116 in an Odata model 220 that is accessible by Odata service channel 114. In an embodiment, blockchain service 106 may also be directly accessible by a user 112 through user interface 222 of application 104.

In 340, metadata is generated based on the data protocol object, wherein the metadata includes a reference to the original data object. For example, build metadata 216 may build metadata 118 for the custom JSON objects 116 of blockchain 106. The metadata 118 may include various relationships between the data objects 108. As described above, Odata model 220 may also include the generate metadata 118.

In 345, a data protocol service is generated based on the metadata, wherein the data protocol service corresponds to the data protocol layer and is configured to communicate with an application interface. For example, Odata service generator 218 may generate or configure Odata service channel 114 based on the Odata model 220, which may include the metadata 118. Odata service channel 114 may then directly communicate with UI components 226 of user interface 222.

In 350, an application interface is generated based on the metadata, wherein the application interface is configured to communicate with both the data protocol layer and the blockchain service. For example, UI application generator may generate a set of UI components 226 for user interface 222 of application 104. In an embodiment, a system developer may add additional custom UI components 226, enhance or refine the generated UI components 226, and/or arrange the generated UI components 226.

In 360, the application interface is provided to a user who is enabled to update the transactional data through the application interface. For example, BAG 102 may generate application 104 which may be accessible to a user 112 on their mobile device. User 112 may, through application 104, create, read, update, and/or delete transactional data from blockchain 106 and/or a database 110.

Figure 4:
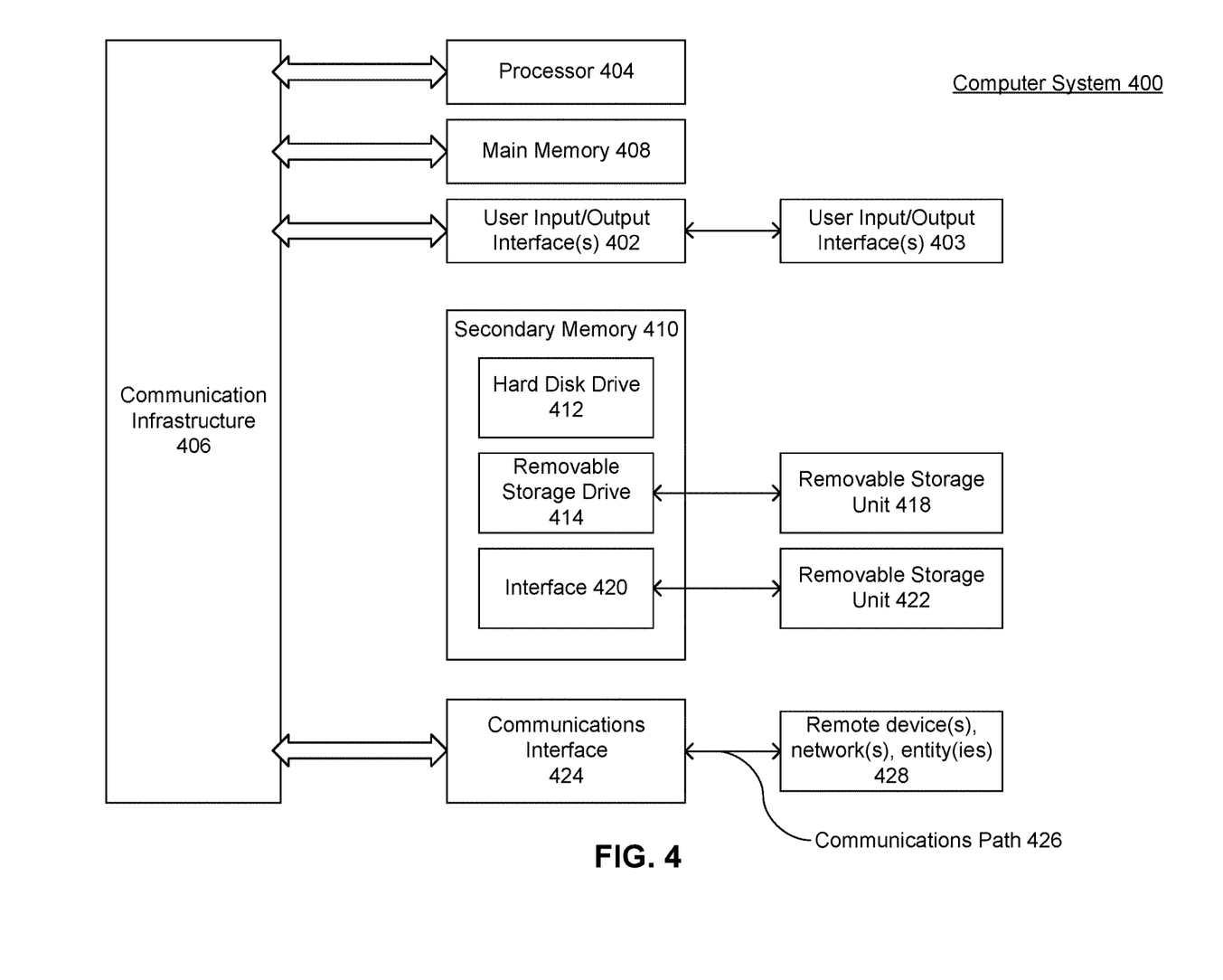
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random-access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    determining a blockchain service storing transactional data and receiving updates to the transactional data of the blockchain service, wherein the blockchain service includes an original data object comprising at least a portion of the transactional data;
    generating an enhanced data object including a wrapper with one or more additional properties corresponding to the original data object of the blockchain service;
    transforming the enhanced data object into a data protocol object, wherein the data protocol object is readable by a data protocol layer communicatively coupled to the blockchain service;
    generating metadata based on the data protocol object, wherein the metadata includes a reference to the original data object;
    generating a data protocol service based on the metadata, wherein the data protocol service corresponds to the data protocol layer;
    generating an application interface comprising one or more user interface components configured to modify data of the original data object;
    configuring the application interface based on the metadata to communicate with both the data protocol service and the blockchain service; and
    providing the application interface to a user who is enabled to update the transactional data through the application interface.

2. The method of claim 1, wherein the data protocol layer is communicatively coupled with both a backend database and the blockchain service.

3. The method of claim 1, wherein the original data object comprises a javascript Object Notation (JSON) object.

4. The method of claim 3, wherein the data protocol layer comprises an open data protocol (OData) layer.

5. The method of claim 4, further comprising:
determining and implementing chaincode corresponding to creation, reading, updating, and deletion of the transactional data; and
generating the OData layer based on both the chaincode and the metadata.

6. The method of claim 4, wherein the generating the application interface comprises:
generating connections between the application interface, a cloud platform, and the OData layer.

7. The method of claim 1, further comprising:
receiving one or more customizations to the application interface from a user, wherein the provided application interface includes the one or more customizations.

8. The method of claim 1, wherein the blockchain service includes a plurality of original data objects, and wherein the metadata includes references to both the plurality of original data objects and one or more relationships between the plurality of original data objects.

9. A system, comprising:
a memory; and
at least one processor coupled to the memory and configured to perform instructions that cause the at least one processor to perform operations comprising:
determining a blockchain service storing transactional data and receiving updates to the transactional data of the blockchain service, wherein the blockchain service includes an original data object comprising at least a portion of the transactional data;
generating an enhanced data object including a wrapper with one or more additional properties corresponding to the original data object of the blockchain service;
transforming the enhanced data object into a data protocol object, wherein the data protocol object is readable by a data protocol layer communicatively coupled to the blockchain service;
generating metadata based on the data protocol object, wherein the metadata includes a reference to the original data object;
generating a data protocol service based on the metadata, wherein the data protocol service corresponds to the data protocol layer;
generating an application interface comprising one or more user interface components configured to modify data of the original data object;
configuring the application interface based on the metadata to communicate with both the data protocol service and the blockchain service; and
providing the application interface to a user who is enabled to update the transactional data through the application interface.

10. The system of claim 9, wherein the data protocol layer is communicatively coupled with both a backend database and the blockchain service.

11. The system of claim 9, wherein the original data object comprises a Javascript Object Notation (JSON) object.

12. The system of claim 11, wherein the data protocol layer comprises an open data protocol (OData) layer.

13. The system of claim 12, the operations further comprising:
determining and implementing chaincode corresponding to creation, reading, updating, and deletion of the transactional data; and
generating the ° Data layer based on both the chaincode and the metadata.

14. The system of claim 9, the operations further comprising:
receiving one or more customizations to the application interface from a user, wherein the provided application interface includes the one or more customizations.

15. The system of claim 9, wherein the blockchain service includes a plurality of original data objects, and wherein the metadata includes references to both the plurality of original data objects and one or more relationships between the plurality of original data objects.

16. A non-transitory computer-readable device having instructions stored thereon that, when executed by at least one computing device, cause the at least one computing device to perform operations comprising:
determining a blockchain service storing transactional data and receiving updates to the transactional data of the blockchain service, wherein the blockchain service includes an original data object comprising at least a portion of the transactional data;
generating an enhanced data object including a wrapper with one or more additional properties corresponding to the original data object of the blockchain service;
transforming the enhanced data object into a data protocol object, wherein the data protocol object is configured to be readable by a data protocol layer communicatively coupled to the blockchain service;
generating metadata based on the data protocol object, wherein the metadata includes a reference to the original data object;
generating a data protocol service based on the metadata, wherein the data protocol service corresponds to the data protocol layer;
generating an application interface comprising one or more user interface components configured to modify data of the original data object;
configuring the application interface based on the metadata to communicate with both the data protocol service and the blockchain service; and
providing the application interface to a user who is enabled to update the transactional data through the application interface.

17. The device of claim 16, wherein the original data object comprises a Javascript Object Notation (JSON) object.

18. The device of claim 17, wherein the data protocol layer comprises an open data protocol (OData) layer.

19. The device of claim 18, the operations further comprising:
determining and implementing chaincode corresponding to creation, reading, updating, and deletion of the transactional data; and
generating the OData layer based on both the chaincode and the metadata.

20. The device of claim 16, the operations further comprising:
receiving one or more customizations to the application interface from a user, wherein the provided application interface includes the one or more customizations.

* * * * *